(12) United States Patent
Hagiwara et al.

(10) Patent No.: US 7,173,661 B2
(45) Date of Patent: Feb. 6, 2007

(54) IMAGE-CAPTURING DEVICE AND CAMERA

(75) Inventors: Kosuke Hagiwara, Funabashi (JP); Masao Nakajima, Kawasaki (JP)

(73) Assignee: Nikon Corporation, Tokyo (JP)

( * ) Notice: Subject to any disclaimer, the term of this patent is extended or adjusted under 35 U.S.C. 154(b) by 787 days.

(21) Appl. No.: 10/347,582

(22) Filed: Jan. 22, 2003

(65) Prior Publication Data
US 2004/0012706 A1   Jan. 22, 2004

(30) Foreign Application Priority Data
Jan. 25, 2002   (JP) .............................. 2002-016878

(51) Int. Cl.
*H04N 5/232* (2006.01)

(52) U.S. Cl. ...................................... 348/340; 348/357

(58) Field of Classification Search ................ 348/340, 348/357, 373–375, 370; 396/79; 359/698, 359/700
See application file for complete search history.

(56) References Cited

U.S. PATENT DOCUMENTS

| 5,592,250 A * | 1/1997 | Shimizu ....................... 396/79 |
| 5,602,681 A * | 2/1997 | Nakayama et al. .......... 359/698 |
| 6,002,531 A * | 12/1999 | Nakashima et al. ......... 359/700 |
| 6,515,705 B1 * | 2/2003 | Fumio et al. ................ 348/375 |

* cited by examiner

*Primary Examiner*—Vivek Srivastava
*Assistant Examiner*—James M. Hannett
(74) *Attorney, Agent, or Firm*—Oliff & Berridge, PLC

(57) ABSTRACT

An image-capturing device includes a photographic optical system; an image-capturing element provided rearward of the photographic optical system along an optical axis of the photographic optical system, which captures an image of a subject by receiving a light flux having been transmitted through the photographic optical system; and a motor provided further rearward of the image-capturing element along the optical axis, which drives the photographic optical system along the optical axis.

7 Claims, 5 Drawing Sheets

IMAGE-CAPTURING DEVICE AND CAMERA

INCORPORATION BY REFERENCE

The disclosure of the following priority application is herein incorporated by reference:
Japanese Patent Application No. 2002-016878 filed Jan. 25, 2002

BACKGROUND OF THE INVENTION

1. Field of the Invention

The present invention relates to an image-capturing device that captures an image formed by a light flux having been transmitted through a photographic optical system by employing an image-capturing element such as a CCD, and more specifically, it relates to an image-capturing device that uses a motor to focus and a motor to zoom the photographing optical system.

2. Description of the Related Art

In a digital still camera, focusing is achieved by driving a focusing optical system in a photographic optical system with a focusing motor and zooming is achieved by driving a zooming optical system in the photographic optical system with a zooming motor. The structural arrangement adopted in the lens drive mechanism in cameras in the related art necessitates the photographic optical system and the motors to be disposed side-by-side along a direction extending perpendicular to an optical axis of the photographic optical system.

However, when the motors are disposed along the same direction as the photographic optical system in this manner, the space in which they are disposed needs to have a width or a depth at least large enough to match both the diameter of the photographic optical system and the diameters of the motors, and this requirement poses difficulties in achieving the miniaturization of the cameras.

SUMMARY OF THE INVENTION

The present invention provides an image-capturing device and a camera in which the width and the depth of the area where the photographic optical system and the motors are provided can be minimized.

The image-capturing device according to the present invention comprises a photographic optical system; an image-capturing element provided rearward of the photographic optical system along an optical axis of the photographic optical system, which captures an image of a subject by receiving a light flux having been transmitted through the photographic optical system; and a motor provided further rearward of the image-capturing element along the optical axis, which drives the photographic optical system along the optical axis.

In the image-capturing device, it is preferred that an output shaft of the motor extends parallel to the optical axis.

It is preferred that the image-capturing device further comprises a shaft member extending along the optical axis, which causes the photographic optical system to move along the optical axis through a rotation thereof, wherein the shaft member and an output shaft of the motor are set on a single axis. In this connection, it is preferred that the shaft member and the output shaft are formed as separate members; and the shaft member and the output shaft are coaxially linked with each other. It is preferred that the image-capturing device further comprises a board at which the image-capturing element is mounted, wherein the motor is disposed so that when viewed along the direction of optical axis, the motor partially overlaps the image-capturing element; and a notch or a hole through which the output shaft of the motor or the shaft member passes is formed at the board.

It is further preferred that the motor is disposed so that when viewed along the direction of optical axis, the motor partially overlaps the image-capturing element.

It is further preferred that the photographic optical system includes a focusing optical system and a zooming optical system; and the motor includes a motor for driving the focusing optical system and a motor for driving the zooming optical system.

The camera according to the present invention comprises a main unit and a photographic lens unit that is allowed to rotate relative to the main unit. The photographic lens unit comprises a photographic optical system; an image-capturing element provided rearward of the photographic optical system along an optical axis of the photographic optical system, which captures an image of a subject by receiving a light flux having been transmitted through the photographic optical system; and a motor provided further rearward of the image-capturing element along the optical axis, which drives the photographic optical system along the optical axis.

In the camera, it is preferred that the photographic lens unit further includes a distended portion at a side of the photographic optical system, which distends toward the main unit; a flash light emission unit provided in the distended portion; and a condenser utilized for flash light emission, which is provided rearward of the motor along the optical axis.

A camera according to an another aspect of the present invention comprises a monitor mounting unit and a photographic lens unit that is allowed to rotate relative to the monitor mounting unit. The photographic lens unit comprises a photographic optical system; an image-capturing element provided rearward of the photographic optical system along an optical axis of the photographic optical system, which captures an image of a subject by receiving a light flux having been transmitted through the photographic optical system; and a motor provided further rearward of the image-capturing element along the optical axis, which drives the photographic optical system along the optical axis. The monitor mounting unit includes a monitor at which an image captured by the image-capturing element is displayed.

DESCRIPTION OF THE PREFERRED EMBODIMENT

Figure 1:
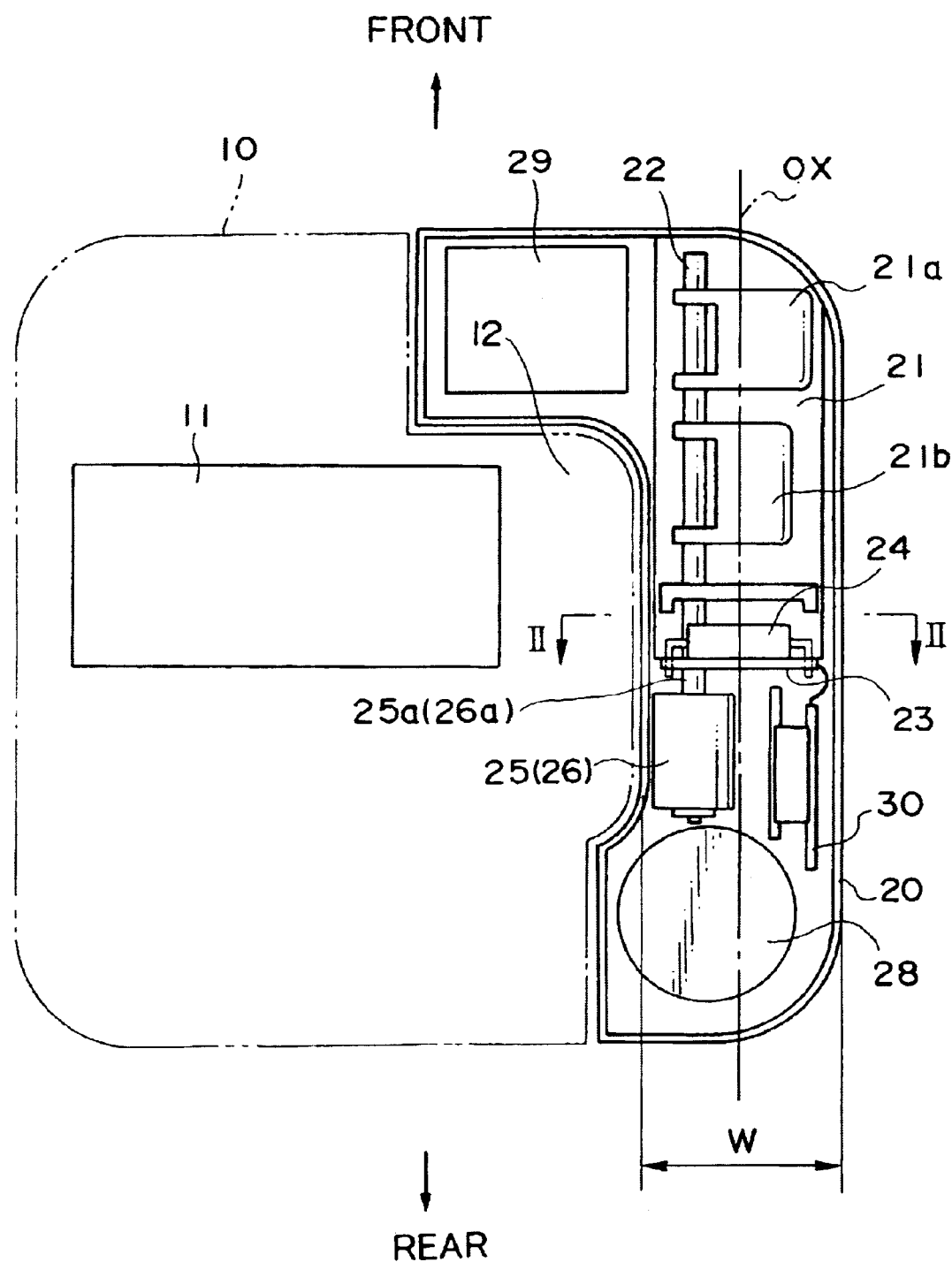
FIG. 1 shows a section of a plan view of a digital still camera achieved in an embodiment of the present invention.
Figure 2:
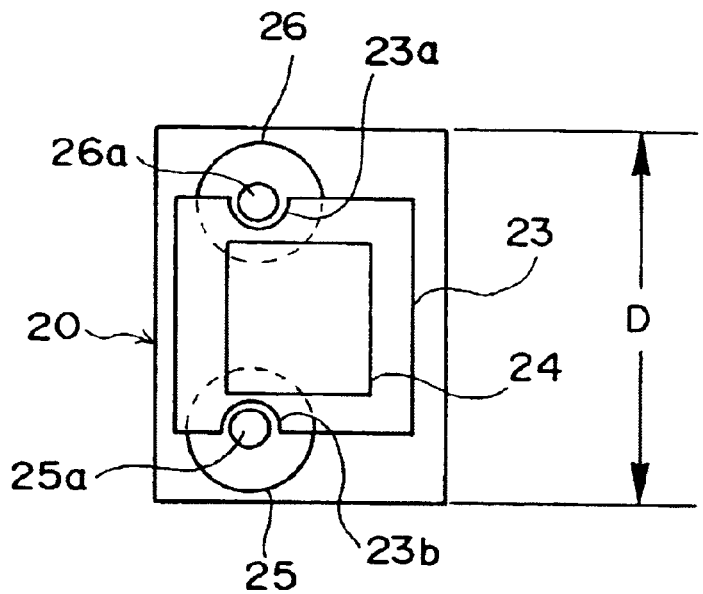
FIG. 2 is a sectional view taken along line II—II in FIG. 1.

An embodiment of the present invention is now explained in reference to FIGS. 1 and 2. FIG. 1 is a plan view of the digital still camera achieved in the embodiment and FIG. 2 is a sectional view taken along line II—II in FIG. 1. The digital still camera comprises a main unit 10 indicated by the 2-point chain line and a photographic lens barrel unit (hereafter simply referred to as a lens barrel unit) 20 indicated by the solid line, and the lens barrel unit 20 is allowed to rotate relative to the main unit 10 around an axis extending perpendicular to a photographic optical axis OX of the lens barrel unit 20. The figure shows the internal structure of the lens barrel unit 20. A photographic optical system 21 provided at the lens barrel unit 20 includes a focusing optical system (focusing lens) held by a lens frame 21a and a zooming optical system (zooming lens) held by a lens frame 21b, and the two lens frames 21a and 21b are screwed onto a pair of drive shafts 22 (only one shaft is shown in the figure) extending along the optical axis.

To the rear of the photographic optical system 21, a board 23 mounted with a CCD 24, which functions as an image-capturing element, is provided. In this explanation, the direction further toward a subject along the photographic optical axis OX when performing a photographing operation by turning the photographic optical system 21 toward the subject is termed as the front and the opposite direction is termed as the rear. The light receiving surface of the CCD 24 and the mounting surface of the board 23 at which the CCD 24 is mounted are set perpendicular to the optical axis of the photographic optical system 21. In this embodiment, the photographic optical system 21 and the CCD 24 are set on a single straight line. In other words, the photographic optical axis OX extends as a single straight line. A subject light flux having passed through the photographic optical system 21 is received at the CCD 24 where it is converted to electric image signals, and image data obtained by executing specific image processing on the image signals are recorded into a memory card (not shown) at the main unit 10. In addition, the captured image is displayed at a monitor 11. It is to be noted that another type of image-capturing element (e.g., a CMOS) may be utilized instead of a CCD.

It is also to be noted that FIG. 1 shows the camera in a non-photographing state during which the lens barrel unit 20 remains stored. When taking a picture, the lens barrel unit 20 is rotated to an appropriate extent to set the photographic optical axis OX toward the subject while turning the surface of the main unit 10 at which the monitor 11 is mounted toward the photographer.

To the rear of the board 23, a stepping motor 25 for focusing and a stepping motor 26 for zooming are provided. A board 30 at which a control circuit for the CCD 24 is mounted is also provided to the rear of the board 23. As shown in FIG. 2, the motors 25 and 26 are set along the vertical direction, one above the other, and are held by a holding member (not shown) together with the boards 23 and 30. Output shafts 25a and 26a of the motors 25 and 26 are each coaxially linked to corresponding one of the pair of drive shafts 22 mentioned earlier and, as a result, the drive shafts 22 are caused to rotate as the motors 25 and 26 rotate. Then, as one of the drive shafts 22 rotates, the lens frame 21a moves along the optical axis to achieve focusing whereas, as the other drive shaft 22 rotates, the lens frame 21b moves along the optical axis to achieve zooming.

As described above, the output shafts 25a and 26a of the motors 25 and 26 are coaxially connected to the associated drive shafts 22 and focusing and zooming are achieved by rotating the drive shafts 22 with the motors 25 and 26. This structure allows the motors 25 and 26 to be disposed to the rear of the photographic optical system 21 and the CCD 24 and, as a result, the width W and the depth D of the area around the center of lens barrel unit can be set smaller compared to the width and the depth required when the motors 25 and 26 and the photographic optical system 21 are disposed along a single direction extending perpendicular to the optical axis OX. The width W and the depth D in the explanation refer to the dimensions measured along the direction perpendicular to the optical axis OX of the lens barrel unit 20. It is to be noted that while it is possible to dispose the motors to the rear of the CCD in a structural arrangement other than that described above, the width W or the depth D in such an alternative structure is bound to be great due to the space requirement to be satisfied with regard to the motor drive force transmitting system and depending upon the size of the available space, the alternative structure can not always be adopted.

In addition, the output shafts 25a and 26a may be directly connected or they may be connected via a fairly simple motive force transmitting system with the drive shafts 22 in the embodiment. For this reason, the load of the motive force transmitting system remains small and compact motors with a small drive torque can be utilized to further contribute to the miniaturization of the lens barrel unit 20.

Furthermore, in this embodiment, the output shafts 25a and 26a are linked to the associated drive shafts 22 through notches 23a and 23b respectively formed at the top and bottom ends of the board 23. With the notches formed at the board 23 to allow the output shafts 25a and 26a to pass through without making contact with the board 23, the distances from the output shafts 25a and 26a to the CCD 24 can be minimized and thus, the motors 25 and 26 can be set as close as possible to the optical axis OX. It also becomes possible to adopt a structure in which as viewed along the direction of the optical axis OX, the motors 25 and 26 partially overlap the CCD 24, as shown in FIG. 2. As a result, the depth D of the lens barrel unit 20 can be further reduced. It is to be noted that holes may de formed at the board 23 instead of notches.

Figure 3:
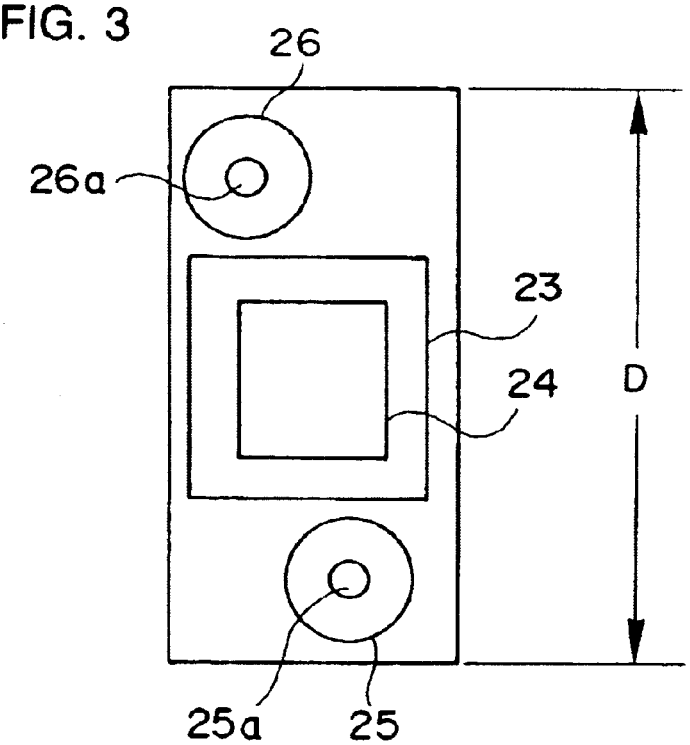
FIG. 3 illustrates the problem arising when the motors are disposed to the front of the image-capturing element.

FIG. 3 presents an example in which the motors 25 and 26 are set to the front of the CCD 24 for comparison. In this structure, the motors 25 and 26 are to be set above and below the photographic optical system 21, which results in a great increase in the depth D of the lens barrel unit 20 over the depth D achieved in the embodiment.

Referring again to FIG. 1, to the rear of the motors 25 and 26, i.e., at the rear end of the lens barrel unit 20, a main condenser 28 for flash light emission is provided. Since the diameter of the main condenser 28 is larger than the width of the photographic optical system 21, the portion of the lens barrel unit 20 where the main condenser 28 is housed slightly distends toward the main unit 10. In addition, the portion of the lens barrel unit 20 ranging from its front surface to the vicinity of the center of the photographic optical system 21, too, distends toward the main unit 10, and a flash light emission unit 29 is disposed in this distended area. The flash light emission unit 29, which is constituted of a flash light emitting tube, a reflector, a flash light emission circuit and the like, not shown, is set further toward the main unit and, for this reason, the portion of the lens barrel unit 20 assumes a rough L shape instead of a rectangular shape as in the related art.

Since the flash light emission unit 29 and the condenser 28 are respectively disposed to the side of the photographic optical system 21 and to the rear of the CCD 24, instead of above or below the photographic optical system 21, as described above, their presence does not raise the profile of the lens barrel unit 20.

The main unit 10 assumes a shape which corresponds to the shape of the lens barrel unit 20, i.e., its portion to the rear of the flash light emission unit 29 (the distended portion) is made to distend toward the lens barrel unit 20, so that the camera achieves a substantially rectangular parallelopiped shape as a whole. As the width W at the lens barrel unit 20 is reduced, sufficient space can be secured for the distended portion of the main unit 10 and thus, a liquid crystal monitor, a memory card, batteries, an electric circuit board and the like can be housed to extend in the distended portion with no problem. The monitor 11, for instance, is set utilizing the distended portion 12 of the main unit 10 as shown in FIG. 1.

Figure 4:
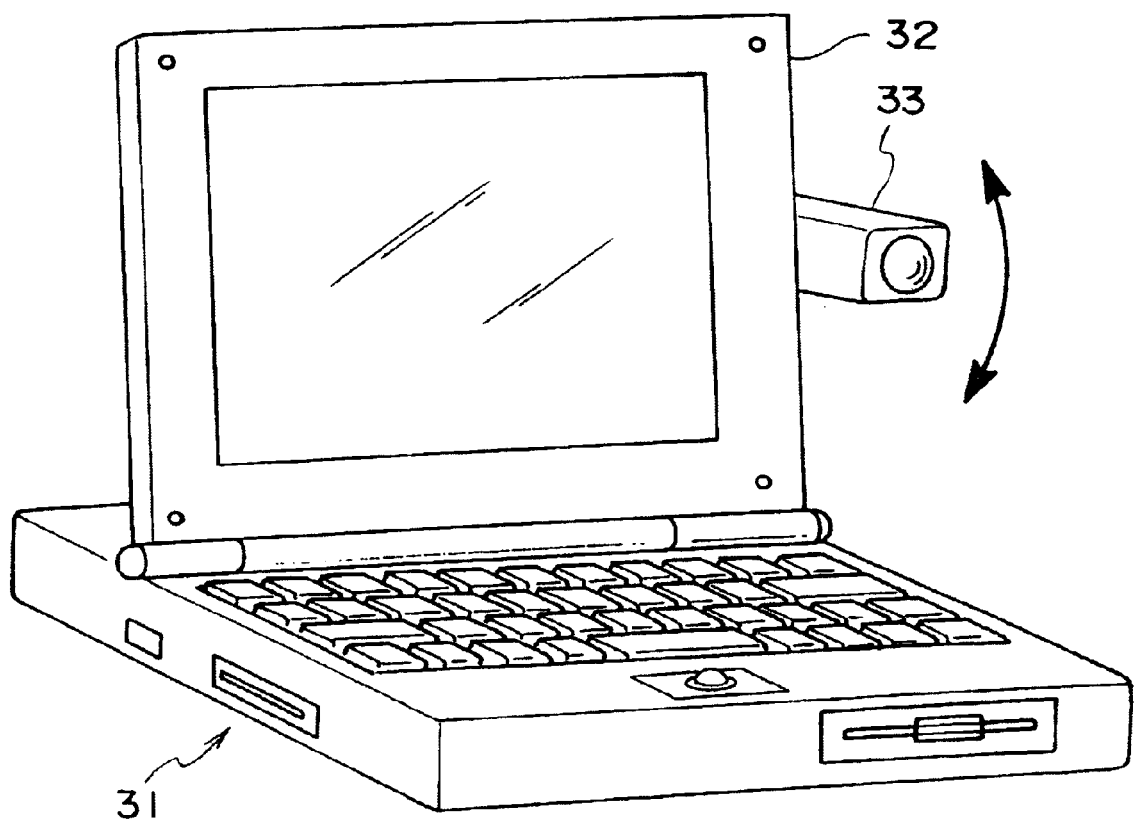
FIG. 4 presents an example in which the photographic lens barrel unit is mounted on the right side of the monitor of a notebook-type personal computer.

It is to be noted that while the present invention is adopted in a digital still camera in the embodiment described above, the present invention is not limited to the embodiment. For instance, the present invention may be adopted in a camera (image-capturing device) mounted at a monitor or the like of a notebook-type personal computer, a PDA or a personal computer. FIG. 4 shows an example in which a photographic lens barrel unit 33 is mounted on the right side of a monitor 32 of a notebook-type personal computer 31. As in the embodiment described above, the photographic lens barrel unit 33 is internally provided with a photographic optical system, a CCD, photographic optical system drive motors and the like, and is allowed to rotate relative to the monitor 32. The photographic lens barrel unit 33 is rotated until it is set substantially perpendicular to the monitor 32 before use. It is to be noted that the photographic lens barrel unit 33 may be mounted at the upper side of the monitor 32, instead. A captured image is displayed at the monitor 32 through a specific program executed on the notebook-type personal computer 31.

Figure 5:
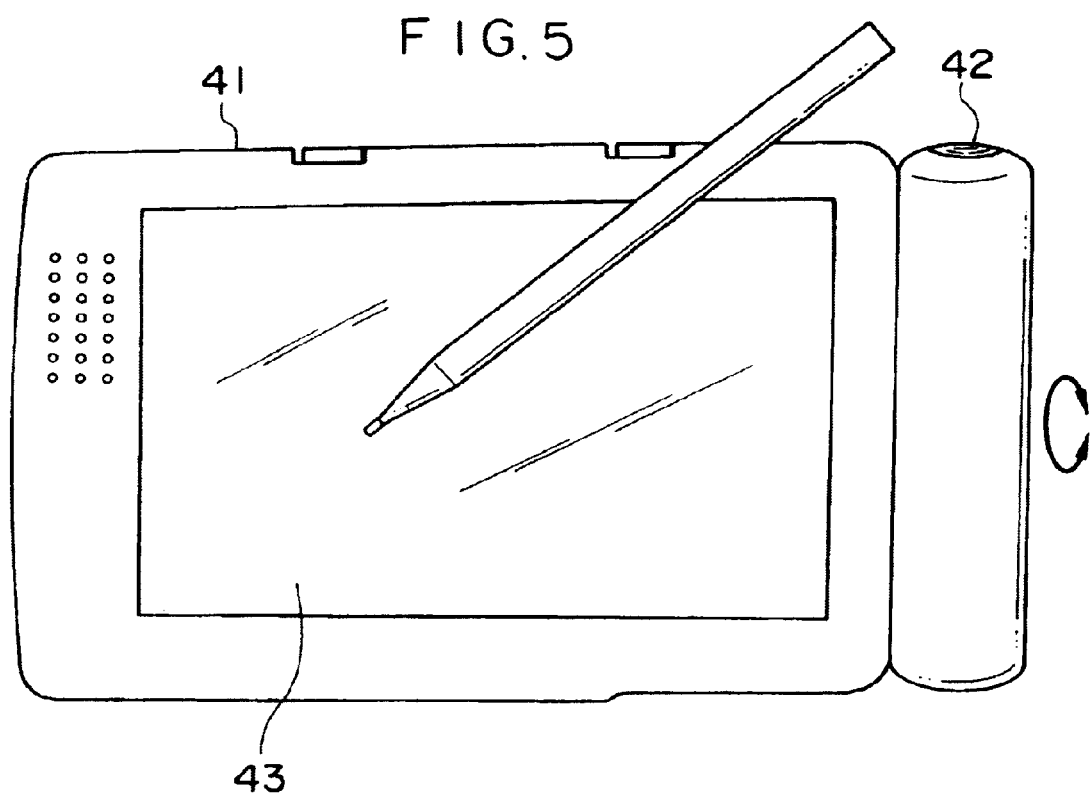
FIG. 5 presents an example in which the photographic lens barrel unit is mounted on the right side of a PDA main unit.

FIG. 5 shows an example in which a photographic lens barrel unit 42 is mounted on the right side of a PDA main unit 41. As in the embodiment described above, the photographic lens barrel unit 42 is internally provided with a photographic optical system, a CCD, photographic optical system drive motors and the like, and is allowed to rotate relative to the PDA main unit 41. The photographic lens barrel unit 42 is rotated until it is set substantially perpendicular to the PDA main unit 41 before use. It is to be noted that the photographic lens barrel unit 33 may be mounted at the upper side of the PDA main unit 41, instead. A captured image is displayed at a monitor 43 of the PDA through a specific program executed on the PDA main unit 41.

Figure 6:
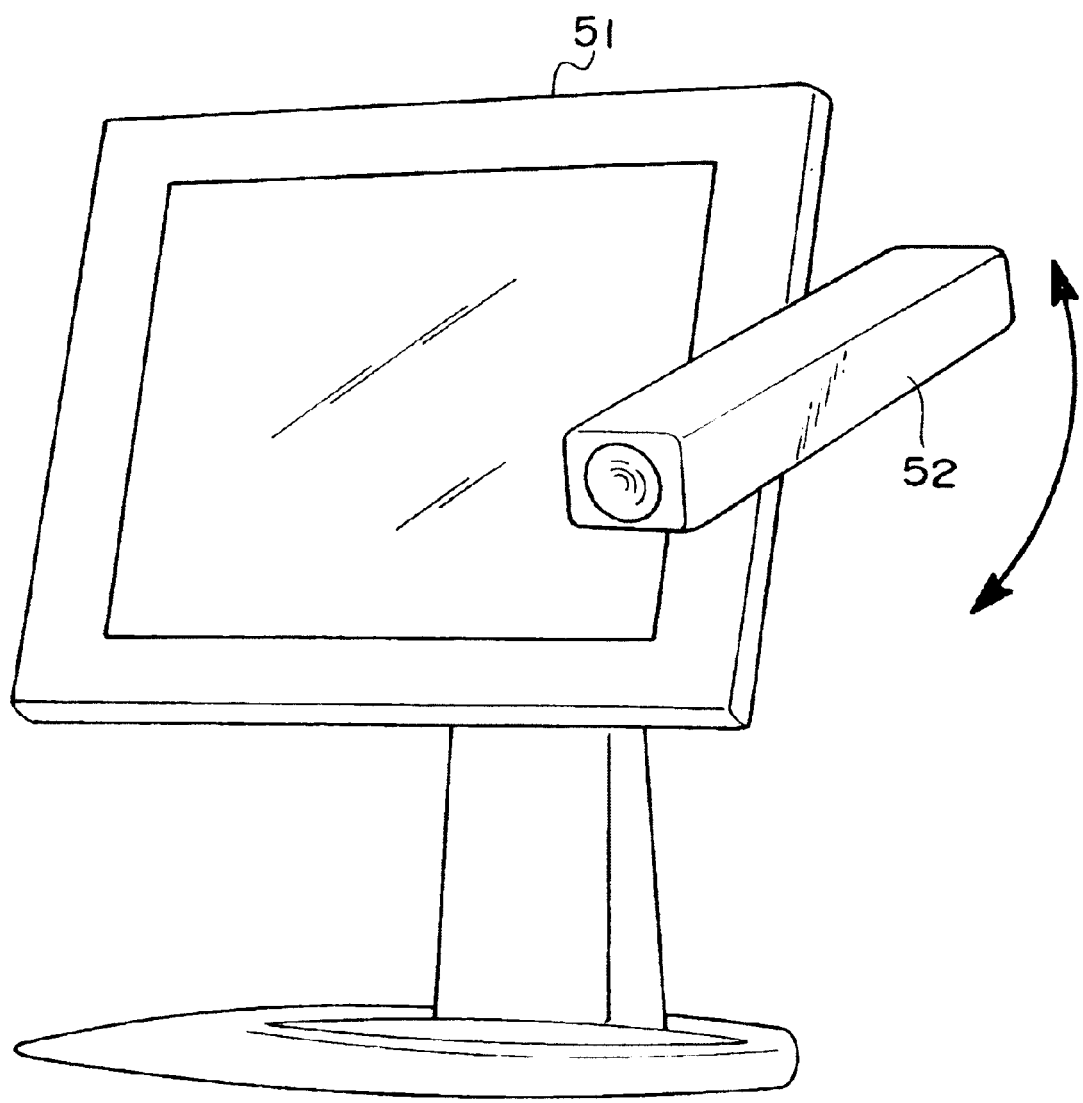
FIG. 6 presents an example in which the photographic lens barrel unit is mounted on the right side of the monitor of a personal computer.

FIG. 6 shows an example in which a photographic lens barrel unit 52 is mounted on the right side of a monitor 51 of a personal computer (not shown). As in the embodiment described above, the photographic lens barrel unit 52 is internally provided with a photographic optical system, a CCD, photographic optical system drive motors and the like, and is allowed to rotate relative to the monitor 51. The photographic lens barrel unit 52 is rotated until it is set substantially perpendicular to the monitor 51 before use. It is to be noted that the photographic lens barrel unit 52 may be mounted at the upper side of the monitor 51 instead. A captured image is displayed at the monitor 51 through a specific program executed on the personal computer.

In addition, while the present invention is adopted in a digital still camera in the embodiment described above, the present invention is not limited to the embodiment. For instance, it may be adopted in a video camera that handles dynamic images.

Furthermore, while an explanation is given in reference to the embodiment on an example in which the output shafts 25a and 26a of the motors 25 and 26 are coaxially linked with the associated one of the pair of drive shafts 22, the present invention is not limited to this structure. The output shafts 25a and 26a may instead be formed as elongated shafts which also function as the drive shafts 22.

Also, while the photographic optical system 21 and the CCD 24 are disposed on a single straight line in the embodiment described above, the present invention is not limited to this structure. The present invention may be adopted in a structure in which the optical axis is made to bend at the front of the CCD 24 by a prism or a mirror. In such a case, the CCD 24 is disposed along the optical axis which has been bent, and the motors are set to the rear of the CCD 24. This structure, too, enables the width and the depth of the lens barrel unit where the photographic optical system and the CCD 24 are provided to be minimized.

Moreover, while the present invention is adopted in a camera having the lens barrel unit 20 that is rotatable relative to the main unit 10 in the embodiment described above, the present invention is not limited to this structure. The present invention may be adopted in a camera having a permanent lens barrel fixed to the camera body. The present invention may also be adopted in a camera having a lens barrel mounted at the main unit and a monitor rotatably mounted at the main unit. In this case, the dimensions of the main unit at which the lens barrel is mounted can be reduced along the direction extending perpendicular to the optical axis. Namely, the structure allows the size of the main unit to be reduced or assures sufficient space in which various components can be comfortably mounted at the main unit.

The above described embodiment is an example, and various modifications can be made without departing from the spirit and scope of the invention.

What is claimed is:

1. An image-capturing device comprising:
   a photographic optical system;
   an image-capturing element provided rearward of the photographic optical system along an optical axis of the photographic optical system, which captures an image of a subject by receiving a light flux having been transmitted through the photographic optical system;
   a motor provided further rearward of the image-capturing element along the optical axis, which drives the photographic optical system along the optical axis; and
   a shaft member extending along the optical axis, which causes the photographic optical system to move along the optical axis through a rotation of the shaft member, wherein:
   the shaft member and an output shaft of the motor are set on a single axis; and
   the motor is disposed so that when viewed along the direction of the optical axis, the motor partially overlaps the image-capturing element.

2. An image-capturing device according to claim 1, wherein:
   the shaft member and the output shaft are formed as separate members; and
   the shaft member and the output shaft are coaxially linked with each other.

3. An image-capturing device according to claim 1, further comprising:

a board at which the image-capturing element is mounted, wherein:

a notch or a hole through which the output shaft of the motor or the shaft member passes is formed at the board.

4. An image-capturing device according to claim 1, wherein:

the photographic optical system includes a focusing optical system and a zooming optical system; and the motor includes a motor for driving the focusing optical system and a motor for driving the zooming optical system.

5. A camera comprising:

a main unit; and a photographic lens unit that is allowed to rotate relative to the main unit, wherein:

the photographic lens unit comprises:

a photographic optical system;

an image-capturing element provided rearward of the photographic optical system along an optical axis of the photographic optical system, which captures an image of a subject by receiving a light flux having been transmitted through the photographic optical system;

a motor provided further rearward of the image-capturing element along the optical axis, which drives the photographic optical system along the optical axis; and a shaft member extending along the optical axis, which causes the photographic optical system to move along the optical axis through a rotation of the shaft member, wherein:

the shaft member and an output shaft of the motor are set on a single axis; and the motor is disposed so that when viewed along the direction of the optical axis, the motor partially overlaps the image-capturing element.

6. A camera comprising:

a main unit; and a photographic lens unit that is allowed to rotate relative to the main unit, wherein:

the photographic lens unit comprises:

a photographic optical system;

an image-capturing element provided rearward of the photographic optical system along an optical axis of the photographic optical system, which captures an image of a subject by receiving a light flux having been transmitted through the photographic optical system; and a motor provided further rearward of the image-capturing element along the optical axis, which drives the photographic optical system along the optical axis, wherein:

the photographic lens unit further includes:

a distended portion at a side of the photographic optical system, which distends toward the main unit;

a flash light emission unit provided in the distended portion; and a condenser utilized for flash light emission, which is provided rearward of the motor along the optical axis.

7. A camera comprising:

a monitor mounting unit; and a photographic lens unit that is allowed to rotate relative to the monitor mounting unit, wherein:

the photographic lens unit comprises:

a photographic optical system;

an image-capturing element provided rearward of the photographical optical system along an optical axis of the photographic optical system, which captures an image of a subject by receiving a light flux having been transmitted through the photographic optical system;

a motor provided further rearward of the image-capturing element along the optical axis, which drives the photographic optical system along the optical axis; and a shaft member extending along the optical axis, which causes the photographic optical system to move along the optical axis through a rotation of the shaft member, wherein:

the shaft member and an output shaft of the motor are set on a single axis;

the motor is disposed so that when viewed along the direction of optical axis, the motor partially overlaps the image-capturing element; and the monitor mounting unit includes a monitor at which an image captured by the image-capturing element is displayed.

* * * * *